Patented Jan. 3, 1933

1,892,973

UNITED STATES PATENT OFFICE

GUSTAV WIETZEL, OF LUDWIGSHAFEN-ON-THE-RHINE, AND ALFRED STARKE, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF UNSATURATED GASEOUS HYDROCARBONS AND HYDROGEN

No Drawing. Application filed April 9, 1927, Serial No. 182,529, and in Germany April 15, 1926.

The present invention relates to the production of valuable unsaturated gaseous hydrocarbons and of hydrogen or gas mixtures containing hydrogen from saturated or substantially saturated hydrocarbons or gas mixtures containing the same.

We have found that such hydrocarbons or gas mixtures containing the same can be converted into the said more valuable gases in a simple and very economical manner by subjecting them first to a treatment suitable for producing unsaturated hydrocarbons such as acetylene and ethylene. This conversion may be effected in various ways. It may for instance take place by electric heating, for example by means of an electric arc; such methods have repeatedly been suggested and any of them may be employed in our process. The said conversion may also be effected by a process comprising a kind of incomplete combustion, such as has been suggested for instance in the application for patent Ser. No. 162,074, filed Jan. 19th, 1927. The gaseous unsaturated hydrocarbons formed by this treatment are then separated from the gas mixture, if desired after the unsaturated hydrocarbons have been subjected to further reactions, for example after they have been converted into acetaldehyde or benzene. The residual gas is then converted into a mixture of carbon monoxid and hydrogen by treating it in the known manner with steam, or with oxygen or gases containing oxygen, or with both these agents at a temperature in the absence or presence of catalysts. The said agents are employed only in such amounts and under such conditions that complete combustion to carbon dioxid and water does not take place. If desired, this conversion may also be assisted by an electric arc. The resulting mixture of carbon monoxid and hydrogen may be either directly employed for example for the catalytic manufacture of methanol, or it may be decomposed with steam to produce a mixture of carbon dioxid and hydrogen, from which pure hydrogen can readily be obtained which may be employed for example for the synthesis of ammonia.

As the conversion of hydrocarbons or gases containing the same into unsaturated hydrocarbons cannot be carried out in a quantitative manner at all or only with great difficulty, the process according to our present invention involves the advantage that the hydrocarbons can be completely converted into much more valuable gases or gas mixtures and thus be utilized for the production of a great variety of compounds.

The following examples will further illustrate how our invention may be carried out in practice, but the invention is not limited to these examples.

Example 1

A gas mixture consisting of 20 per cent of methane and 80 per cent of hydrogen is passed through an electric arc. The resulting gas contains 3 per cent of acetylene which is absorbed by means of active charcoal. The residual gas is preheated in any suitable manner and then subjected to partial combustion by means of oxygen, whereby its temperature is raised to about 1100° C.; thereafter it is passed together with steam over a catalyst consisting of nickel and alumina. The resulting gas contains 7.6 per cent of carbon dioxid, 7.2 per cent of carbon monoxid, 84.8 per cent of hydrogen and 0.4 per cent of methane.

Example 2

1100 cubic metres of natural gas heated to about 500° C. are subjected to an acetylene-forming treatment consisting in an incomplete combustion with about 400 cubic metres of oxygen. The resulting gas mixture composed of about 20 cubic metres of carbon dioxid, 90 cubic metres of acetylene, 400 cubic metres of carbon monoxid, 700 cubic metres of hydrogen, 500 cubic metres of methane and 20 cubic metres of nitrogen, is passed at 700° C. over silica coated with graphite, whereby benzene is formed which is separated from the gas mixture by means of active charcoal at room temperature. The residual gas mixture is then passed through hot water and thus saturated with water vapor, then preheated to about 600° C. and subjected to partial combustion with about 270 cubic metres of oxygen. The combustion gases are passed, after an addition of steam, over a catalyst consisting of nickel and magnesia. The resulting gas contains besides carbon dioxid, nitrogen and small quantities of methane (about 0.4 per cent) chiefly carbon monoxid and hydrogen in the proportion of about 1 to 2; after removing the carbon dioxid and traces of sulfuretted hydrogen present, it may directly be employed for the synthesis of methanol.

What we claim is:

1. A process for the production of unsaturated hydrocarbons, hydrogen and carbon monoxide, which comprises subjecting natural gas to a treatment in the electric arc, passing the resulting gas mixture at about 700° C. over silica coated with graphite, separating off the benzene formed, saturating the residual gas mixture with water vapor, preheating the said gas mixture to about 600° C., subjecting it to partial combustion with oxygen, adding steam and passing the said mixture over a catalyst consisting of nickel and magnesia, and removing the carbon dioxide formed.

2. The process of producing unsaturated gaseous hydrocarbons and hydrogen which comprises subjecting a gas comprising saturated hydrocarbons to a treatment in the electric arc, whereby acetylene and other unsaturated hydrocarbons are formed, separating the said hydrocarbons formed from the gas mixture and converting the residual gas into a mixture substantially composed of carbon monoxid and hydrogen by treatment at a high temperature with at least 1 agent of the group consisting of steam and oxygen, the said agents being employed in such amounts that complete combustion to water and carbon dioxid does not take place.

3. The process of producing unsaturated gaseous hydrocarbons and hydrogen which comprises subjecting a gas comprising saturated hydrocarbons to a treatment in an electric arc to thereby form acetylene and other unsaturated hydrocarbons, separating the hydrocarbons formed from the gas mixture and converting the residual gas into a mixture, substantially composed of carbon monoxide and hydrogen, by treatment at a high temperature in the presence of a catalyst comprising nickel and a substance selected from the class consisting of alumina and magnesia, with at least one agent of the group consisting of steam and oxygen, the said agents being employed in such amounts that complete combustion to water and carbon dioxide does not take place.

In testimony whereof we have hereunto set our hands.

GUSTAV WIETZEL.
ALFRED STARKE.